3,054,654
METHOD FOR PURIFYING TUNGSTIC ACID
William C. Lilliendahl, Mountain Lakes, and George H. Keith, East Orange, N.J., assignors to Westinghouse Electric Corporation, East Pittsburgh, Pa., a corporation of Pennsylvania
Filed June 10, 1959, Ser. No. 819,302
6 Claims. (Cl. 23—22)

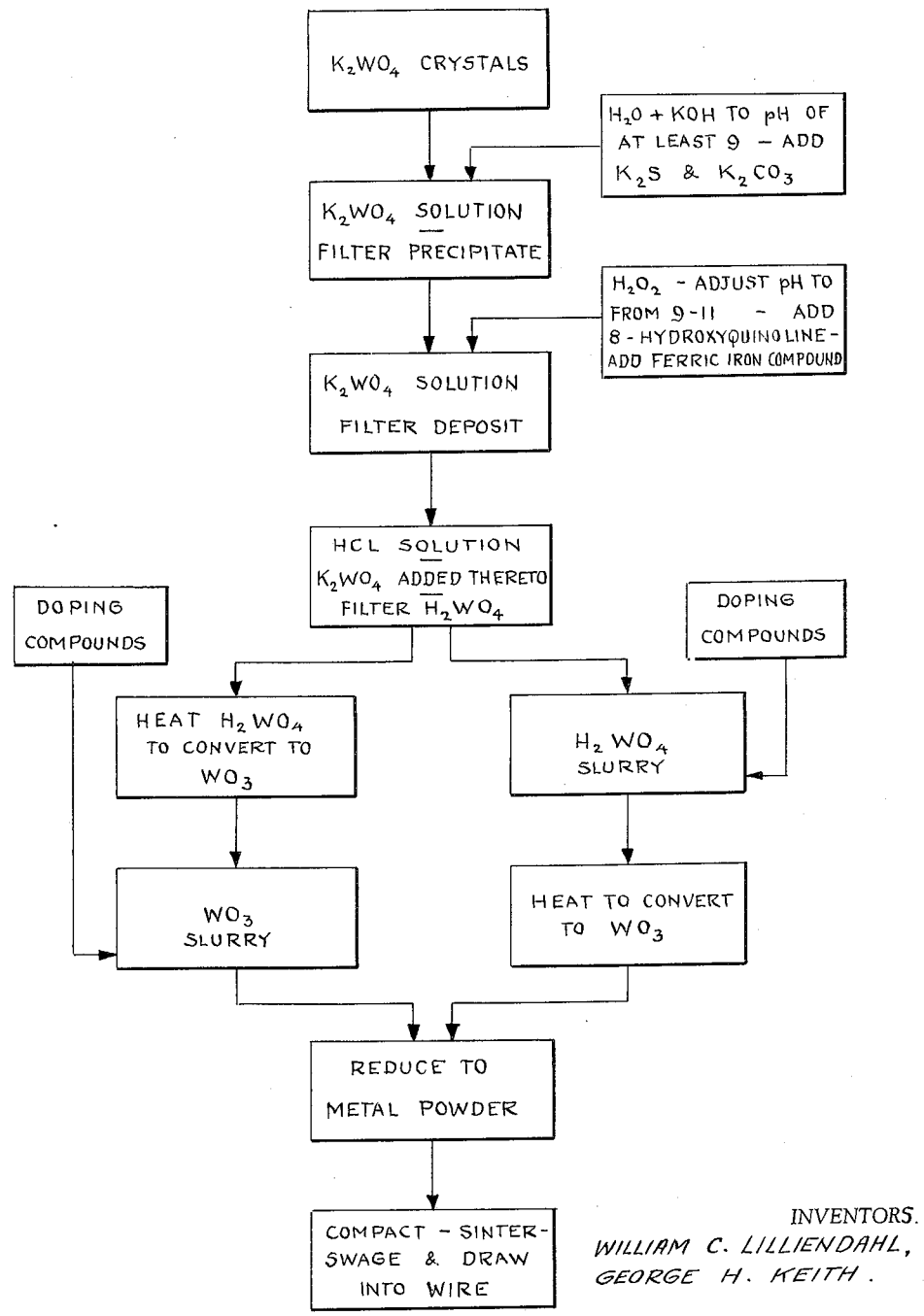

This invention relates to a method for purifying tungsten and a method for obtaining improved tungsten wire and, more particularly, to a method for removing substantially all undesirable impurities from tungstic acid and a method for producing improved non-sag and vibration-resistant tungsten filament wire suitable for use in incandescent lamps.

In the usual production of tungsten filament wire from tungsten ore, the ore such as wolframite is crushed and digested with sodium or potassium hydroxide to form a solution of sodium or potassium tungstate. Sodium or potassium tungstate crystals are recovered by evaporation, dissolved in water and tungstic acid precipitated with hydrochloric acid. Another process is to add calcium chloride to a sodium or potassium tungstate solution obtained from digestion of the ore. This precipitates calcium tungstate, which is separated from the caustic solution. The calcium tungstate is then decomposed with hydrochloric acid to precipitate tungstic acid. The recovered tungstic acid is dissolved in ammonia to form ammonium tungstate and this is either evaporated or neutralized to form ammonium paratungstate. The ammonium paratungstate is then converted to a tungstic oxide by heating.

The recovered tungstic acid or oxide has added thereto selected impurities or so-called doping constituents. Thereafter the tungstic acid or oxide is reduced to tungsten metal powder, which in turn is formed into a self-sustaining green ingot. The green ingot is sintered in hydrogen to form massive tungsten which is swaged and drawn to form tungsten wire. The doping constituents added to the tungsten acid or oxide cause the fabricated tungsten wire when incandesced to recrystallize with an interlocking grain structure. This inhibits filament sag during operation of the lamp incorporating the wire. The non-sag properties of the usual tungsten filament wire are not as good as desired and this wire is susceptible to failure under shock and vibration.

The impurity constituents in the tungsten oxide produced by either of the foregoing prior-art process, apart from those impurities deliberately added by the so-called doping, are relatively high and normally constitute several hundred parts by weight per million parts by weight of tungsten metal in the tungsten oxide. These impurities have a deleterious effect on the finished wire with respect to both shock resistance and resistance to sag.

In order to overcome the foregoing and other difficulties of and objections to prior-art practices, it is the general object of this invention to provide a method for producing improved tungsten filament wire suitable for use in incandescent lamps.

It is another object to provide a method for making wire having improved vibration-resistant and non-sag characteristics.

It is a further object to provide an improved method for removing substantially all objectionable impurities from tungstic acid.

It is an additional object to provide an improved method step for removing impurities from a sodium or potassium tungstate solution.

The aforesaid objects of the invention, and other objects which will become apparent as the description proceeds, are achieved by providing a multi-step method for removing impurities from tungstic acid. One of the principal steps included in this method involves adding additional impurity along with a large organic molecule in order to deposit by coprecipitation or adsorption from alkali tungstate solution substantially all impurities which are not quantitatively precipitated with the organic molecule. In addition, there has been provided a method for producing improved filament wire wherein tungsten oxide or tungstic acid has first removed therefrom substantially all objectionable impurities and so-called doping constituents are added to this highly-purified material.

For a better understanding of the invention, reference should be had to the sole figure in the drawing which illustrates a flow diagram of the method steps involved in producing highly-purified tungstic oxide or tungstic acid and also including the steps of doping this purified material.

As a preliminary step to the present invention, tungsten ore such as wolframite is first pulverized and digested in conventional fashion with sodium or potassium hydroxide. The sodium or potassium hydroxide reacts with the tungsten compound in the ore to form a sodium or potassium tungstate solution which upon evaporation yields sodium or potassium crystals which are separated from the ore mother liquor by filtration. The foregoing method steps are conventional.

While the present method is operable to purify either sodium or potassium tungstate solution, it is preferred to purify a potassium tungstate solution. Accordingly, the flow diagram as illustrated and following description consider in detail the purification of a potassium tungstate solution. It should be understood that all of the potassium compounds as considered herein could be replaced by equivalent amounts of corresponding sodium compounds, adjusting the amounts of such sodium compounds to provide the same relative gram-mole proportions of sodium compounds as the potassium compounds which are illustrated and described.

In accordance with the present invention, recovered potassium tungstate crystals are placed in aqueous solution in a processing tank with added potassium carbonate and potassium sulfide, adjusting to a pH of at least 9. Deionized water is used to dissolve the potassium tungstate crystals and preferably this water contains less than 0.1 part per million by weight of iron and less than 2 parts per million by weight of total solids. The pH is maintained at least at 9 by adding potassium hydroxide to the solution. This pH is required to prevent precipitation of insoluble tungsten complex salt and to insure that insoluble carbonates and sulfides will substanially precipitate. The potassium carbonate is added in sufficient amount to insure that all possible calcium and other impurities which form insoluble carbonates are precipitated. The potassium sulfide is added in sufficient amount to provide sufficient sulfide ion to remove all possible iron and other metallic impurities which will precipitate as insoluble sulfides. As a specific example, to 16.35 kilograms of potassium tungstate crystals containing approximately 60% $WO_3$ are added 49 liters deionized water, one pound of potassium carbonate and one pound of potassium sulfide, together with sufficient potassium hydroxide to bring the pH to 10. This solution is digested for two hours at a temperature of 90° C. The solution is then allowed to cool and stand for an extended period, such as twelve hours, to insure complete precipitation of all insoluble material. The digesting temperature and time and standing period are subject to considerable variation. Thereafter the precipitated sulfides and carbonates are filtered off and the solution pumped to a further processing tank which preferably is fabricated of stainless steel.

Hydrogen peroxide is added to the solution in this further processing tank in order to oxidize any remaining sulfides to sulfates. Sodium peroxide could be used in place of the hydrogen peroxide although this would introduce alkali ions into the solution which would later have to be removed and additional impurities would be introduced with the alkali peroxides. The use of hydrogen peroxide eliminates these disadvantages. The pH of the solution is then adjusted if necessary with either hydrogen chloride or potassium hydroxide so that it is about 10 although pH values of from 9 to 11 are suitable. At a pH of less than 9, insoluble tungstate complexes will separate and at a pH greater than 11, the metallic quinolates which are precipitated will tend to dissolve. As a specific example, to the foregoing solution is added four pounds of hydrogen peroxide. Thereafter 8-hydroxyquinoline is added to the solution in sufficient quantity to deposit by precipitation, coprecipitation or adsorption substantially all aluminum, iron, magnesium, calcium, manganese, nickel, tin, titanium, zirconium and lead impurities remaining in the solution, in addition to ferric iron compound which is deliberately added thereafter. It is important that the 8-hydroxyquinoline be added before the ferric iron compound since if the iron compound is added first, some of it will precipitate as ferric hydroxide. This is not desirable since the effectiveness of this step is dependent on the presence of a substantial amount of the large organic molecule of ferric quinolate to deposit impurities from the solution by coprecipitation or adsorption. The quinoline is desirably dissolved in an acetic acid solution before introduction into the potassium tungstate solution as the quinoline is more soluble in a slightly-acidic medium. As a specific example, 3.15 liters of 8-hydroxyquinoline solution having a concentration of 20 grams of this material and 45 milliliters acetic acid in one liter of deionized water are added to the foregoing potassium tungstate solution. The resulting solution is heated to a temperature of from 30° C. to 65° C. and preferably to about 50° C. Thereafter ferric iron in compound form is added to the potassium tungstate solution in amount of at least about 50 p.p.m. by weight of tungsten in the solution. As a specific example 7 grams of ferric ammonium sulfate dissolved in 450 ml. deionized water are added to the foregoing solution. The ferric iron quantitatively precipitates in the presence of the 8-hydroxyquinoline to form a very large molecule and this large molecule has the effect of coprecipitation or adsorption of other impurities which are not quantitatively precipitated by this reagent. The foregoing solution is digested for about two hours for example and the resulting deposit is filtered off. In the usual case, approximately 200 p.p.m. by weight of total impurities are removed by this step.

The resulting relatively-pure potassium tungstate solution is pumped to an additional processing tank, which can be fabricated of stainless steel, and is added to a hydrochloric acid solution to precipitate tungstic acid from the potassium tungstate solution. This step is conventional and subject to modifications. As an example, sufficient hydrochloric acid is used so that the concentration of hydrochloric acid is about 25 grams per 100 cc. of hydrochloric acid solution at the start of precipitation and about 7 grams of hydrochloric acid per 100 cc. of total solution at the end of precipitation. This effects a partial neutralization of the solution. Desirably a small amount of nitric acid is added at the start of the tungstic acid precipitation, and at the end of this step, in order to preserve the valence state of the tungstic acid and to oxidize to carbon dioxide and water excess remaining quinoline. Removal of excess quinoline is also achieved by washing the tungstic acid after precipitation. As a specific example, 33.1 liters of concentrated hydrochloric acid and 4.0 liters of concentrated nitric acid are diluted to 59.2 liters and the foregoing potassium tungstate solution added thereto.

The precipitated tungstic acid is washed with a slightly-acidic solution to remove potassium compounds, including any remaining sulfates. The slightly-acidic nature of this wash inhibits the formation of colloidal particles which would interfere with filtration. As a specific example, the tungstic acid is washed with dilute hydrochloric acid which can have a concentration of 1 to 2% for example. The tungstic acid slurry is then filtered and dried at 110° C. for example to obtain tungstic acid free of hydrochloric acid. Alternatively, tungstic oxide is obtained by heating at elevated temperatures such as 300° C. or greater.

The use of 8-hydroxyquinoline is known for removing impurities from tungstate solutions and is disclosed in U.S. Patent No. 2,414,601, dated January 21, 1947. This material quantitatively precipitates iron and magnesium and also deposits or removes by coprecipitation and adsorption, aluminum, calcium, manganese, nickel, tin, titanium, zirconium and lead, as well as a substantial amount of any silicon. The manganese, nickel, tin, titanium, zirconium and lead normally occur in tungsten ores in limited quantities and the iron, aluminum, calcium and magnesium are normally present in greater amounts. In accordance with the aforementioned U.S. patent, the 8-hydroxyquinoline can be used to remove most of these materials from tungstates. Since coprecipitation or adsorption is required to remove many of these impurities, however, the process is not as effective as desired. In order to increase the effectiveness of the 8-hydroxyquinoline for those impurities which are coprecipitated or adsorbed, additional iron which is quantitatively precipitated by the quinolate is deliberately added to the tungstate solution. In this manner, those impurities which coprecipitate or are adsorbed are more effectively and completely deposited from the solution to produce a pure tungstate solution.

The foregoing purified tungstic acid or tungstic oxide will contain less than 100 parts per million by weight of tungsten of total impurity, excluding potassium and silicon which are normally reduced to very low values such as 2–10 p.p.m. during sintering. Those impurities which are considered very objectionable, such as aluminum, iron, calcium and magnesium, will be present at most only in trace amounts. The aluminum will be present in not more than 5 parts per million by weight of the tungsten, iron in amount not more than 15 parts per million by weight of tungsten, calcium in amount not more than 5 parts per million by weight of tungsten and magnesium in amount not more than 2 parts per million. It is important to remove substantially all of the aluminum from the tungstic oxide or acid even though aluminum compound is later deliberately added as impurity. The reasons for this are not understood, but as a possible explanation, the residual aluminum which is deposited by coprecipitation or adsorption apparently is present in a form which is not suitable for doping and which deleteriously affects the quality of the wire.

If it is desired to remove substantially all residual silicon and potassium, the tungstic acid or tungstic oxide is reduced to tungsten metal powder in conventional fashion, such as by heating in a hydrogen atmosphere at a temperature of from 600 to 875° C. The resulting tungsten metal powder is then formed into a slurry with deionized water and washed with a hydrofluoric acid solution which desirably contains a limited amount of hydrochloric acid, such as 15 cc. concentrated HCl per liter of water, in order to cause the tungsten powder to coagulate and settle more rapidly in the washing solution. The concentration of the hydrofluoric acid can be varied considerably but as an example, 450 ccs. concentrated hydrofluoric acid in one liter water is used as a wash for each kilogram of tungsten powder. Any residual acid is then removed by a water washing by decantation. Thereafter the washed tungsten powder is dried at a somewhat elevated temperature such as 100° C. The resulting pure tungsten powder can be made into wire by conventional practices such as pressing into green ingots, electrically sintering in a hydrogen atmosphere, and thereafter mechanically reducing to wire of the desired size, such as by swaging and drawing. The resulting wire is very unusual in that when incandesced, it recrystallizes with an interlocking crystal structure. An interlocking structure obtained without the use of doping additives has never been reported previously and what is known as an equiax structure is normally obtained where doping additives are not utilized.

The foregoing tungstic oxide or tungstic acid can be doped to produce wire of superior quality. In such doping, the tungstic oxide or tungstic acid has added thereto inorganic doping compounds which include silicon, potassium and aluminum and which compounds are free from other metallic impurity. These doping compound additives are conveniently expressed in terms of percent by weight of equivalent tungstic acid in the tungsten compound which is doped. The percent by weight of silicon in the doping compounds as expressed in terms of equivalent silicon dioxide should constitute from 0.2% to 0.6% and preferably about 0.4% by weight of tungsten as expressed in terms of tungstic acid. The percent by weight of aluminum in the doping compound as expressed in terms of equivalent aluminum trioxide should constitute from 0.02% to 0.05% and preferably about 0.03% by weight of tungsten as expressed in terms of tungstic acid. The percent by weight of potassium in the doping compounds as expressed in terms of equivalent potassium chloride should constitute from 0.2% to 0.6% and preferably about 0.5% by weight of tungsten as expressed in terms of tungstic acid. The potassium- and silicon-containing compounds apparently act to purify the metal even more by expulsion during the treating cycle and the purpose of the aluminum-containing doping compound is to obtain a large grain count in the sintered ingot. As a specific example, to a slurry of 10.86 kilograms of tungstic oxide and 500 milliliters deionized water are added 172 milliliters of potassium silicate (containing 0.1006 gram $K_2O$ per cc. and 0.2460 gram $SiO_2$ per cc.) and 20.7 grams potassium chloride. Also added are 15.5 grams aluminum chloride (having 6 molecules of water of hydration, gram mole weight 241.44). To the foregoing is added 10.2 liters of 2% hydrochloric acid. The hydrochloric acid precipitates the silica throughout the tungsten compound in a very uniform fashion. The foregoing slurry is evaporated to remove the water, dried and then milled to insure that the doping additives are evenly distributed throughout. If desired the tungstic acid can be doped in accordance with the foregoing specific example. After reduction in hydrogen the doped tungsten metal powder is pressed in conventional fashion, sintered conventionally such as described in U.S. Patent No. 1,082,933, dated December 10, 1913, and thereafter mechanically reduced into wire of the desired size, such as by conventional swaging and drawing. For a suitable swaging and drawing schedule, see application S.N. 683,809, filed September 13, 1957, and owned by the present assignee.

The resulting wire when incandesced will recrystallize with an interlocking structure. The non-sag properties of this wire are greatly improved over those normally obtained. The vibration resistance of the resulting wire is much better than the corresponding properties of a similar conventionally doped wire formed from tungstic oxide or tungstic acid containing several hundred parts per million by weight of impurity. In controlled comparative tests, the cold-shock characteristics of the present wire were found to be approximately 100 times better than factory-production control wire which was produced by doping tungstic oxide which contained several hundred parts per million by weight of impurities. In these controlled cold-shock tests, 75-watt lamps of conventional design were fabricated from the present wire and from the factory production control wire. These lamps were mounted on a pendulum which was allowed to swing freely so that the lamps contacted a plate and were brought to an abrupt stop. These shocks were continued until the filament wire broke. Lamps fabricated from the present wire withstood the shock test 98.5 times better than the control lamps. That is, the lamps fabricated with the present wire withstood an average of 98.5 times as many shocks before breaking as the lamps fabricated with the control wire.

While the foregoing description has considered in detail the purification of a potassium tungstate solution by adding potassium compounds and other reagents thereto, corresponding sodium or potassium compounds can be used in equivalent gram mole proportions with respect to the tungstate to replace the indicated potassium compounds, whether a sodium or potassium tungstate solution is being purified.

It will be recognized that the objects of the invention have been achieved by providing a method for producing improved tungsten filament wire suitable for use in incandescent lamps and a method for making tungsten filament wire having improved vibration-resistant and non-sag characteristics. There has also been provided a method for removing substantially all objectionable impurities from tungstic acid and an improved method step for removing impurities from an alkali tungstate solution.

While best embodiments of the invention have been illustrated and described in detail hereinbefore, it is to be particularly understood that the invention is not limited thereto or thereby.

We claim:

1. The method of removing substantially all aluminum, iron, calcium, magnesium, manganese, nickel, tin, titanium, zirconium, and lead impurities from tungstic acid, which method comprises adjusting the pH of an aqueous solution of one of the group consisting of sodium and potassium tungstate to at least 9, adding to said solution sufficient compound of one of the group consisting of sodium and potassium carbonate and sufficient compound of one of the group consisting of sodium and potassium sulfide to precipitate therefrom all impurities which form insoluble carbonates and sulfides, separating residual solution from precipitate, adding to residual solution sufficient hydrogen peroxide to oxidize to sulfate all sulfides remaining in said solution, adjusting the pH of said solution to from 9 to 11, heating said solution to a temperature of from 30° C. to 65° C., adding to said solution 8-hydroxyquinoline in amount at least sufficient to deposit therefrom all of said impurities remaining as well as additional iron in compound form added to said solution thereafter, adding to said solution water soluble ferric iron in compound form in amount of at least about 50 p.p.m. by weight of tungsten in said solution, digesting said solution until substantially all added ferric iron and said impurities other than those present as sulfates remaining therein are deposited therefrom, separating deposit from remaining tungstate solution, precipitating tungstic acid from said tungstate solution, and separating tungstic acid precipitate from remaining solution.

2. The method of removing substantially all aluminum, iron, calcium, magnesium, manganese, nickel, tin, titanium, zircon ium and lead impurities from tungstic acid, which method comprises adjusting the pH of an aqueous solution of potassium tungstate to at least 9, adding to said solution sufficient potassium carbonate and potassium sulfide to precipitate therefrom all impurities which form insoluble carbonates and sulfides, separating residual solution from precipitate, adding to residual solution sufficient hydrogen peroxide to oxidize to sulfate all sulfides remaining in said solution, adjusting the pH of said solution to from 9 to 11, heating said solution to a temperature of from 30° C. to 65° C., adding to said solution 8-hydroxyquinoline in amount at least sufficient to deposit therefrom all of said impurities remaining as well as additional iron in compound form added to said solution thereafter, adding to said solution water soluble ferric iron in compound form in amount of at least about 50 p.p.m. by weight of tungsten in said solution, digesting said solution until substantially all added ferric iron and said impurities other than those present as sulfates remaining therein are deposited therefrom, separating deposit from remaining tungstate solution, precipitating tungstic acid from said tungstate solution and separating tungstic acid precipitate from remaining solution.

3. The method of removing substantially all aluminum, iron, calcium, magnesium, manganese, nickel, tin, titanium, zirconium and lead impurities from tungstic acid, which method comprises adjusting the pH of an aqueous solution of potassium tungstate to at least 9, adding to said solution sufficient potassium carbonate and potassium sulfide to precipitate therefrom all impurities which form insoluble carbonates and sulfides, separating residual solution from precipitate, adding to residual solution sufficient hydrogen peroxide to oxidize to sulfate all sulfides remaining in said solution, adjusting the pH of said solution to about 10, heating said solution to a temperature of about 50° C., adding to said solution 8-hydroxyquinoline in amount at least sufficient to deposit therefrom all of said impurities remaining as well as additional iron in compound form added to said solution thereafter, adding to said solution ferric ammonium sulfate in amount of at least about 50 p.p.m. by weight of iron per million p.p.m. by weight of tungsten in said solution, digesting said solution until substantially all added ferric iron and said impurities other than those present as sulfates remaining therein are deposited therefrom, separating deposit from remaining tungstate solution, precipitating tungstic acid from said tungstate solution by adding said tungstate solution to a hydrochloric acid solution, and separating tungstic acid precipitate from remaining solution.

4. The method of removing undesirable impurities from an aqueous solution of one of the group consisting of sodium and potassium tungstate which is substantially free from insoluble metal sulfides and carbonates, which method comprises heating said solution to a temperature of from 30° C. to 65° C., adjusting the pH of said solution to from 9 to 11, adding to said solution 8-hydroxyquinoline in amount at least sufficient to deposit therefrom all of said impurities therein as well as additional iron added to said solution thereafter, adding to said solution water soluble ferric iron in compound form in amount of at least 50 p.p.m. by weight of tungsten in said solution, digesting said solution until said added ferric iron is deposited therefrom, and thereafter separating deposit from remaining tungstate solution.

5. The method of removing substantially all undesirable impurities from an aqueous potassium tungstate solution which is substantially free from insoluble metal sulfides and carbonates, which method comprises heating said solution to a temperature of from 30° C. to 65° C., adjusting the pH of said solution to from 9 to 11, adding to said solution 8-hydroxyquinoline in amount at least sufficient to deposit therefrom all of said impurities therein as well as additional iron added to said solution thereafter, adding to said solution water soluble ferric iron in compound form in amount of at least 50 p.p.m. by weight of tungsten in said solution, digesting said solution until said added ferric iron is deposited therefrom, and thereafter separating deposit from remaining potassium tungstate solution.

6. The method of removing substantially all undesirable impurities from an aqueous potassium tungstate solution which is substantially free from insoluble metal sulfides and carbonates, which method comprises heating said solution to a temperature of about 50° C., adjusting the pH of said solution to about 10, adding to said solution 8-hydroxyquinoline in amount at least sufficient to deposit therefrom all of said impurities therein as well as additional iron added to said solution thereafter, adding to said solution ferric ammonium sulfate in amount of at least 50 parts by weight of iron per million parts by weight of tungsten in said solution, digesting said solution until said added ferric iron is deposited therefrom, and thereafter separating deposit from remaining potassium tungstate solution.

References Cited in the file of this patent
UNITED STATES PATENTS

| | | |
|---|---|---|
| 1,585,497 | Just | May 18, 1926 |
| 1,665,636 | Marden et al. | Apr. 10, 1928 |
| 1,796,026 | Iredell | Mar. 10, 1931 |
| 2,316,583 | Highriter et al. | Apr. 13, 1943 |
| 2,414,601 | Lilliendahl | Jan. 21, 1947 |
| 2,459,868 | Burwell | Jan. 25, 1949 |
| 2,556,255 | Carosella | June 12, 1951 |